Feb. 20, 1968 A. L. SCHALDENBRAND 3,369,833
DOOR CHECK
Filed Sept. 14, 1966
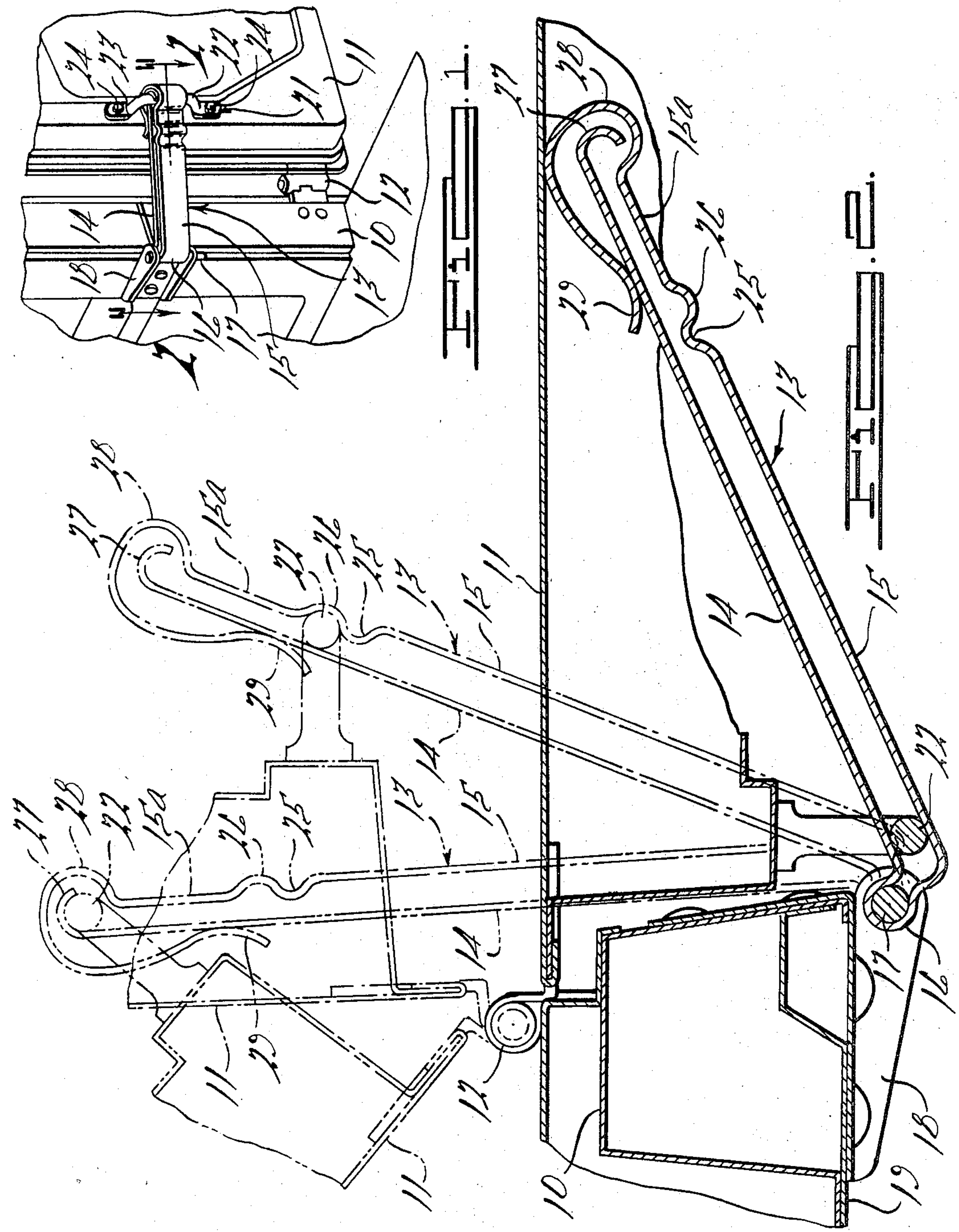
INVENTOR.
Arthur L. Schaldenbrand
BY John R. Faulkner
John J. Roethel
ATTORNEYS 3,369,833

DOOR CHECK

Arthur L. Schaldenbrand, Farmington, Mich., assignor to Ford Motor Company, Dearborn, Mich., a corporation of Delaware Filed Sept. 14, 1966, Ser. No. 579,306
9 Claims. (Cl. 292—268)

ABSTRACT OF THE DISCLOSURE

A door check mechanism for checking the opening movement of doors, such as the cargo doors of a panel truck or other vehicle bodies, by means of an elongated pivoted link comprising substantially parallel members, one end of which is pivoted on the vehicle body, with a crossbar mounted on the door and interposed between the parallel members for movement therebetween. The link opposite the pivoted end has one of the parallel members terminating in an inwardly turned hook-like portions, and the other parallel member terminating in an enlarged loop encompassing the hook-like portion and overlying the other parallel member on its outer side. One of the parallel members has a detent pocket intermediate the ends of the members to receive the crossbar to hold it in a first predetermined checked position, and when the crossbar is moved beyond this position the hook-like portion provides a terminal checking position to hold the door at its maximum displacement relative to the supporting structure on the vehicle body.

This invention relates to a mechanism for checking the opening movement of a swinging structure and also for releasably holding the swinging structure in one or more opened positions, the invention being particularly applicable to the cargo doors of panel truck or other vehicle bodies.

The cargo doors of panel trucks receive much abuse in day to day operation. They are frequently violently swung from a closed to an opened position and thus require a sturdy door checking mechanism effective to prevent the door from banging into the side panel of the truck body. It has also been found desirable that at least two checked opened positions be provided, the first of these being an opening at about 90° and the second being at approximately 168°. The latter figure, i.e., 168° prevents the door from being swung open to an extent that any projections on its surface, such as the operating handle, will not dent the body panel yet will provide substantially a maximum opening to which cargo may be loaded into the vehicle.

The door checking and holding mechanism embodying the present invention comprises an elongated pivoted link which is pivotally mounted at one of its ends preferably on a pivot pin carried on the vehicle body structure. The elongated link comprises spaced substantially parallel members one of which terminates at its end opposite the hinged end of the link in an inwardly turned hook-like portion and the other of which terminates at its end opposite the hinged end in an enlarged loop encompassing the hook-like portion and overlying the member carrying the hook-like portion on the outer side of the latter. One of the parallel members is provided with a transverse ramp portion and an adjacent detent pocket intermediate its ends. The spacing of the parallel members between the terminal ends of the latter and the ramp portion is less than the spacing of the members between the pivoted end of the link and the ramp portion.

A crossbar is mounted on the other of the vehicle body structures, preferably the door structure, and is interposed between the link members for sliding movement therebetween. The crossbar has a slip fit between the parallel members between the pivoted end of the link and the ramp portion on the one member. Thus, during relative movement of the crossbar and the link there is little resistance created to swinging movement of the swingable structure about its hinge axis. As the crossbar approaches the ramp portion and then drops into the detent pocket, this provides a first hold open position. In this first hold open position, the swingable structure or door would be at approximately right angles to the body panel or support structure. This is an adequate opening for access to the interior of a panel truck for most loading and unloading chores. But if it is desired to swing the door to a more fully open position so that it would not interfere with the loading of wide objects into the interior of the panel truck, it is only necessary to exert sufficient pressure on the swingable structure to cause the crossbar to move out of the detent pocket and to force itself through the narrowed gap between the parallel members until the hook-like portion at the terminal end of the one member is reached. The narrowed gap has the effect of being a retarding device in the event the door is flung through the first detent pocket, and also ensures that the door will not be swung into the final opened position at too rapid a rate. The enlarged loop encompassing the hook-like portion functions to control the expansion of the space between the members comprising the link as the crossbar passes therebetween.

Objects, advantages and features of construction embodying the present invention will appear in the following description and appended claims, reference being had to the accompanying drawing forming a part of the specification wherein like reference numerals designate corresponding parts in the several views.

FIG. 1 is a fragmentary perspective view illustrating the door check mechanism embodying the present invention mounted on a vehicle body having a door structure hinged thereto, and FIG. 2 is a view taken substantially on the line 2—2 of FIG. 1 illustrating the door checking and holding mechanism in several positions of operation, the closed position being shown in solid outline and opened positions being shown in dot and dash outline.

In the drawing there is illustrated, by way of example, a certain embodiment of the present invention as applied to the door and frame structures of a vehicle body, preferably a panel truck body. Referring first to FIG. 1, there is shown a portion of a panel truck body pillar 10 having hinged thereto a door 11. The hinge 12 is a common double leaf hinge and forms no part of the present invention. The door checking and retaining mechanism embodying the present invention comprises an arm or link, generally designated 13. The arm or link 13 is preferably formed of a single piece of metal having substantially uniform width and thickness. In its formed shape it comprises two spaced substantially parallel elongated members 14 and 15. As best seen in FIG. 2, the two parallel members are connected at their one end by an integral loop portion 16. The loop portion 16 receives a pintle 17 carried on a bracket 18 mounted on the inner wall 19 of body pillar 10.

Mounted on the door 11 is a crossbar 21, the crossbar 21 having an elongated portion 22 paralleling the pintle 17 and having at each of its end leg extensions 23 adapted to be held by mounting screws 24 or the like to the inner panel of the door 11.

The crossbar 21 elongated portion 22 is illustrated as having a circular cross section and is of a diameter such that it has a loose sliding fit with the parallel spaced members 14 and 15 for approximately two-thirds of the length of the link 13 from its pivoted end. The link member 15 has about one-third of the way from its free end a laterally extending hump or ramp portion 25. The hump or ramp portion 25 extends inwardly towards the member 14 of the link so as to create an obstruction or restricted area inhibiting passage of the crossbar portion 22 therethrough. Outwardly of the hump or ramp portion 25 is a detent pocket 26 adapted to receive the crossbar portion 22 to provide a first check for holding the door in a first predetermined checked position, as will be more fully explained. Continuing onwardly from the pivot of the link 13, the link member 15 has a section 15*a* which again parallels the member 14 but at a reduced spacing therefrom.

Thus, if it is desired to swing the swingable structure or door beyond the first detent pocket 26, this can be done but only with increased resistance to the passage of the portion 22 of the crossbar 21 between the member 14 and section 15*a* of the member 15. This has a retarding effect on opening movement of the door beyond the ramp portion 25.

The member 14 terminates in an inwardly turned semiloop 27 which provides a terminal checking position beyond which the swingable structure or door cannot be swung.

The member 15 has an enlarged loop 28 which encompasses the semilooped portion 27 on the member 14. The enlarged loop 28 encompasses the semiloop 27 and has a reversed bend extension 29 at the end which lies in abutting relation to the outer face of the member 14. With this arrangement, not only must the cross-bar elongated portion 22 attempt to move the member 15*a* away from the member 14, but it must also through the interaction of the member 14 and the extension 29 of the enlargement 28 attempt to open the latter. It will be understood that the link 13 will be made of a suitable steel or material having spring steel characteristics whereby the parts will act in a resilient manner as the swingable structure or door is moved from an opened to a closed position and from a closed to an opened position.

The operation of the door checking and holding mechanism embodying the present invention is illustrated in FIG. 2 in which the parts are shown in solid outline in swingable structure or door closed position. In this position the portion 22 of the crossbar is adjacent to the pintle 17 mounting the link 13 on the body pillar 10. The portion 22 of the crossbar fits tightly enough between the members 14 and 15 to avoid any rattling but it is considered a loose fit as far as permitting easy relative movement longitudinally of the members 14 and 15. As the swingable structure or door 11 is swung from a closed position about its hinge axis, defined by the hinge member 12 and other coacting hinge members not shown, the first check position is reached. This position was generally described as being approximately two-thirds along the length of the link 13. This position may more accurately be described as being at the location at which the door 11 extends at substantially a right angle to the body panel as shown in the intermediate dot-dash outline position in FIG. 2. This position is usually adequate for easy access to the interior of the vehicle body or panel truck body, as the case may be. There are conditions, however, under which when the vehicle is being loaded or unloaded in which it is desirable to provide a maximum opening with the door or swingable structure out of the way so it will not interfere with the manipulation of lift trucks or conveyor belts or the like. To achieve this maximum opened position, it is only necessary to swing the door beyond the first check point or through the area of the link in which the member 14 is opposed by the section 15*a* of member 15. Because of the decreased spacing in this area, the swinging movement of the door is retarded to some extent as the members 14 and 15 are yieldably spread apart. This opening of the gap between the members 14 and 15 is controlled to some extent by the resistance of the loop 28 to expansion since its extension 29 abuts the outer face of the member 14 and reflects any movement of the member 14 away from the member 15.

The semihook portion 27 determines the terminal position of the door opening and in practice it has been found that this terminal position should be approximately 168° from the fully closed position. Most cargo doors are provided with outside operating door handles and if the door was permitted to swing to an extent that it could lay flush with the body panel, the handle would have a tendency to bang and dent the panel. It will be noted from FIG. 2 that the link 13 in the fully opened position of the door is at substantially a right angle to the body panel and thus does not project into the access opening area.

To close the door from either its intermediate open position or its fully opened position, it is only necessary to exert sufficient force on the free end of the door to overcome the resistance of the passage of the crossbar portion 22 over the ramp 25 or between the members 15 and 14. If the door is grasped at its free edge, there is sufficient leverage available so that the resistance of the door checking mechanism can be readily overcome.

The door check mechanism embodying the present invention provides a device having characteristics of sturdiness, inexpensiveness and durability.

It will be understood that the invention is not to be limited to the exact construction shown and described, but that various changes and modifications may be made without departing from the spirit and scope of the invention as defined in the appended claims.

I claim:

1. A door check mechanism for checking the swinging movement and for holding in predetermined checked positions a swingable structure hinged on a supporting structure, said device comprising an elongated link pivotally mounted at one of its ends on one of said structures, said elongated link comprising spaced substantially parallel members one of which terminates at its end opposite the hinged end of the link in an inwardly turned hook-like portion and the other of which terminates at its end opposite the hinged end of the link in an enlarged loop encompassing said hook-like portion and overlying said one member on the outer side of the latter, one of said members having a transverse ramp portion and an adjacent pocket intermediate the ends thereof, the spacing of said members between the terminal ends of the latter and the ramp portion being less than the spacing of the members between the pivoted end of the members between the pivoted end of the link and the ramp portion, and a crossbar mounted on the other of said structures and interposed between said link members for movement therebetween, said crossbar having a slip fit between said members between the pivoted end of said link and said ramp portion to create little resistance to swinging movement of said swingable structure, said detent pocket receiving said crossbar to provide a first check point for holding the swingable structure in a first predetermined checked position, said crossbar being movable between said members beyond said detent pocket with retarded action as it spreads said members apart, said hook-like portion providing a terminal checking action causing said swingable structure to be held at its maximum displacement relative to the supporting structure.

2. A door check device according to claim 1, in which:

said elongated link is formed of a unitary metal strip having a bend therein to provide the parallel members, said metal strip at the end of the link formed by the bend thereof having a hinge pin receiving loop formed integrally therewith to receive a hinge pin carried by said one of said structures.

3. A door checking device according to claim 2, in which:

the enlarged loop at the free end of said link has a leg portion in abutting relation to the outer side of the one member whereby the movement of the crossbar between the members after passage over the ramp portion and through the detent pocket is further resisted by the resistance of the enlarged loop to being opened as the members are spread apart.

4. A door checking device according to claim 3, in which the elongated link is pivotally mounted on the support structure and the crossbar is mounted on the swingable structure.

5. In a checking device according to claim 4, in which:

the detent pocket is located to position the swingable structure at an approximately 90° open position relative to the supporting structure, and the terminal check position is located at approximately 168° of movement of the swingable structure relative to the supporting structure in an opening direction.

6. A door checking device according to claim 1, in which:

the enlarged loop at the free end of said link has a leg portion in abutting relation to the outer side of the one member whereby the movement of the crossbar between the members after passage over the ramp portion and through the detent pocket is resisted by the resistance of the enlarged loop to being opened as the members are spread apart.

7. A door checking device according to claim 6, in which the elongated link is pivotally mounted on the support structure and the crossbar is mounted on the swingable structure.

8. In a checking device according to claim 7, in which:

the detent pocket is located to position the swingable structure at approximately 90° open position relative to the supporting structure, and the terminal check position is located at approximately 168° of movement of the swingable structure relative to the supporting structure in an opening direction.

9. In a checking device according to claim 1, in which:

the detent pocket is located to position the swingable structure at approximately 90° open position relative to the supporting structure, and the terminal check position is located at approximately 168° of movement of the swingable structure relative to the supporting structure in an opening direction.

References Cited

UNITED STATES PATENTS

| | | | |
|---|---|---|---|
| 747,866 | 12/1903 | Diehl | 292—268 |
| 1,238,871 | 9/1917 | Bartran | 217—60 |
| 1,775,116 | 9/1930 | Bertrand | 292—268 |
| 2,707,064 | 4/1955 | Castello | 16—142 |

MARVIN A. CHAMPION, *Primary Examiner.*

E. J. McCARTHY, *Assistant Examiner.*